(12) United States Patent
Ficara et al.

(10) Patent No.: US 12,452,712 B2
(45) Date of Patent: Oct. 21, 2025

(54) RESOURCE-CONSERVING TELEMETRY FOR CONSTRAINED DEVICES

(71) Applicant: Cisco Technology, Inc., San Jose, CA (US)

(72) Inventors: Domenico Ficara, Essertines-sur-Yverdon (CH); Pascal Thubert, Roquefort les Pins (FR); Amine Choukir, Ecublens (CH); Roque Gagliano, Pully (CH)

(73) Assignee: Cisco Technology, Inc., San Jose, CA (US)

( * ) Notice: Subject to any disclaimer, the term of this patent is extended or adjusted under 35 U.S.C. 154(b) by 258 days.

(21) Appl. No.: 18/197,262

(22) Filed: May 15, 2023

(65) Prior Publication Data

US 2024/0388932 A1 Nov. 21, 2024

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
CPC ..... H04W 24/08; H04W 24/10; H04W 84/12; H04L 43/08
See application file for complete search history.

(56) References Cited

U.S. PATENT DOCUMENTS

| | | | |
|---|---|---|---|
| 9,268,844 B1 * | 2/2016 | Kadarkarai | G06F 16/35 |
| 11,516,308 B1 | 11/2022 | Dubynskiy et al. | |
| 2015/0109926 A1 | 4/2015 | Jin et al. | |
| 2019/0306238 A1 | 10/2019 | Kumar et al. | |
| 2020/0162315 A1 * | 5/2020 | Siddiqi | H04L 41/22 |
| 2020/0287782 A1 | 9/2020 | Singh | |
| 2022/0050902 A1 | 2/2022 | Hulick, Jr. | |
| 2022/0303796 A1 * | 9/2022 | Zhang | H04L 41/14 |
| 2022/0405419 A1 | 12/2022 | Joshi et al. | |
| 2023/0006907 A1 | 1/2023 | Mackie et al. | |

OTHER PUBLICATIONS

Team Aspecto "Managing the Cost of Opentelemetry" Aspecto Jul. 25, 2022.
Merico, "Tracking with High Density, Large-Scale Wireless Sensor Networks", retrieved on Apr. 3, 2012 at URL:http://boa.unimib.it/bitstream/10281/7785/1/phd_unimib_550736.pdf, The DiGS Data Gathering System, Feb. 3, 2010, pp. 1-170.
Search Report and Written Opinion for International Application No. PCT/US2024/029473, Dated Sep. 18, 2024, 18 pages.

* cited by examiner

*Primary Examiner* — Christopher M Brandt
(74) *Attorney, Agent, or Firm* — Lee & Hayes, P.C.

(57) ABSTRACT

Techniques for improving telemetry in resource-constrained device environments. In some examples, the techniques include gossiping telemetry information between peer devices of a wireless network to, among other things, reduce telemetry cost and/or an amount of telemetry data streamed to a telemetry collector. In some examples, the techniques may also include intelligently exporting telemetry data from resource-constrained devices towards backend systems without exhausting the resource-constrained devices and/or the backend systems. In examples, the telemetry data may be contextual information associated with an endpoint, an application, a network-device resource (e.g., CPU, battery, memory, storage, etc.), geographical constraints, and/or the like.

20 Claims, 10 Drawing Sheets

RESOURCE-CONSERVING TELEMETRY FOR CONSTRAINED DEVICES

TECHNICAL FIELD

The present disclosure relates generally to, among other things, techniques for improving telemetry in resource-constrained device environments.

BACKGROUND

Wireless networks, and, more generally, resource-constrained devices, are large distributed systems involving different components and different vendors that produce large scale events due to the inherent mobility of wireless clients across the infrastructure and the complex system interactions required for their onboarding, policy evaluation, and policy enforcement. Additionally, resources are typically constrained in these sort of devices in areas such as CPU, memory, storage, and battery. Therefore, unnecessary telemetry information is very expensive for these environments.

Modern observability tools help enable the instrumentation, generation, collection, and exportation of telemetry data. These observability tools provide ways for collecting traces at different levels in hierarchical forms, which are mainly client-server implementations. For instance, some of these observability tools allow to create spans which describe the lifetime of a given event and to attach context to it. Today, by default, all span sources send their respective view to a telemetry collector with their parent relationship, and the telemetry collector creates the spans hierarchy. When an interesting event occurs in a wireless network and has to be traced, typically a wireless local area network controller (WLC) is consulted to perform operations on wireless access points to collect the data.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
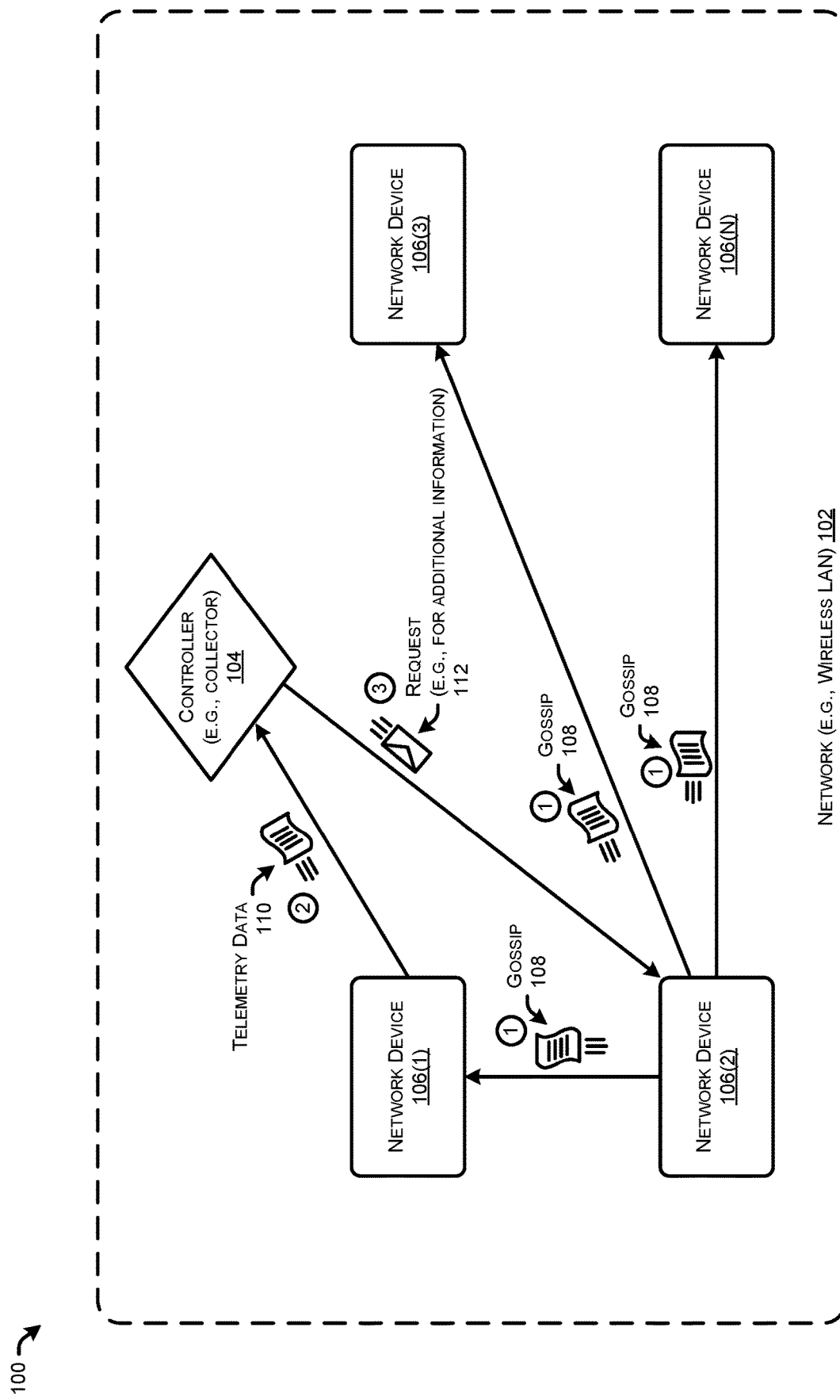
FIG. 1 illustrates an example architecture of a network that may implement various aspects of the technologies described herein.

This disclosure describes various technologies for, among other things, improving telemetry in resource-constrained device environments. By way of example, and not limitation, a method according to the technologies disclosed herein may include determining a dominating set of network devices (e.g., resource-constrained devices, in some examples) of a wireless network, the dominating set including at least a first network device that wirelessly communicates with a second network device excluded from the dominating set. The techniques may also include obtaining telemetry data from the first network device based at least in part on the first network device being included in the dominating set. In some examples, the telemetry data may include first context information that was generated by the second network device and that is related to an event detected in the wireless network. In some examples, the telemetry data may come from or otherwise be associated with an application hosted on the second network device. Based at least in part on the telemetry data, a determination may be made that the second network device has greater information related to the event than the first network device. In some examples, the method may also include obtaining, from the second network device, additional information related to the event based at least in part on determining that the second network device has the greater information.

In additional or alternative examples, the method may also include receiving telemetry data at a backend system associated with a network, the telemetry data including at least contextual information associated with at least one of an endpoint or an application, available resources (e.g., CPU, battery, memory, storage, etc.) of one or more network devices, and/or geographical constraints. Based at least in part on the telemetry data, the backend system may determine a telemetry strategy including tracing rules or metrics defining one or more telemetry actions to be performed responsive to a condition being met. In some examples, the backend system may provide the telemetry strategy to one or more network devices (e.g., resource-constrained devices) of the network.

In additional or alternative examples, the method may also include detecting, by a network device (e.g., resource-constrained device) of a network, an occurrence of an event associated with at least one of the network device or the network. Based at least in part on a telemetry strategy, the network device may store the event (e.g., store data associated with the event, such as instrumentation data, instrumentation context, telemetry data, etc.) in a delay buffer for a period of time. During the period of time, the network device may receive a request from a controller of the network to provide telemetry data associated with the event. In this way, responsive to the request the network device may send the telemetry data associated with the event to the controller.

Additionally, the techniques described herein may be performed as the method and/or by a system having non-transitory computer-readable media storing computer-executable instructions that, when executed by one or more processors, performs the techniques described above and herein.

Example Embodiments

This application is directed to techniques for improving telemetry in resource-constrained device environments. In one aspect of this disclosure, techniques are described for gossiping between wireless network devices (e.g., network devices that communicate wirelessly) at the peer level to, among other things, reduce the amount of information that is needed to be obtained from every single device in a network deployment. Take, for example, a deployment that has multiple network devices (e.g., wireless access points, wireless clients, etc.). If every network device of the deployment were to send a stream of telemetry data for everything (e.g., every event, whether it is resource-based or application-level) that happens on or near that network device, this would be an immense amount of data to be managed. Additionally, if this amount of data was to be reduced through some sort of statistical sampling of the network devices, information may be lost if one of the unchosen network devices encountered a problem or other event.

Accordingly, one aspect of this disclose provides a solution for such scenarios by using gossiping so that network devices (e.g., wireless access points, wireless clients, etc.) may communicate with each other and distribute events of interest through gossiping (e.g., direct communication and/or broadcast) with each other. Then, in some examples, if a telemetry collector or controller wants to collect information from the wireless network deployment, it may statistically choose a certain network device and eventually determine a complete picture of what is going on in the whole network deployment based on the telemetry data that the certain network device has generated itself, as well as what this certain network device has heard or learned through gossiping.

In some examples, a wireless network device may gossip (e.g., broadcast), to neighboring devices, information related to events detected by the wireless network device. In some examples, the wireless network device may gossip real data or may gossip metadata. For instance, in one example the wireless network device may gossip all the instrumentation contexts or trace contexts (metadata) related to all events in the network device execution. Additionally, or alternatively, the wireless network device may gossip all its logs, views, and/or traces it owns on its events of interest. In another example, whenever traces or metrics are gossiped by the wireless network device, what is gossiped may be a summarization of the event plus a reference/cookie, in the interest of reducing information.

In some examples, the wireless network device may encode the gossiped information. For instance, a bloom filter of trace context identifiers may be broadcasted, which may allow the wireless network device to distribute N trace context identifiers to all neighboring devices with a single message (where "N" may equal any number).

In some examples, the wireless network device may be configured to gossip certain information/events. For instance, if the wireless network device were to gossip all information about detected events, the solution may be very chatty. As such, in some examples, overhead may be reduced by means of match/action policies (e.g., "trace for client MAC=X," "events for value>threshold," certain wireless clients, particular entities, particular packet, particular protocols, etc.) and/or other policies. Additionally, or alternatively, the wireless network device may decide to statistically sample its own events and share a portion of them with some or all of its neighbors.

In some examples, the wireless network device may be configured to gossip to certain neighbors and/or entities. For example, each wireless network device of a deployment may spend a portion of their time in monitoring mode, observing what happens around it. In examples, some devices may stay in monitoring mode because that is their purpose, while other devices may spend only enough time in monitoring mode to function correctly in their access/networking mode. Therefore, in some examples, a first wireless network device ((e.g., access point or client) may identify a problem on second (e.g., neighboring) wireless network device (e.g., no beacons sent in the last second) and the first wireless network device may share with the second wireless network device a trace span context. That is, in general and according to the technologies described herein, wireless networking devices may gossip selective information that is of interest to the destination of the gossip, whether that destination be a peer network device (e.g., access point), a wireless client, a telemetry collector, a network controller, and/or the like. Additionally, or alternatively, wireless network devices may tune their gossiping time (e.g., how many pieces of gossiped information they share with neighbor devices) according to their mode of operation (e.g., monitoring or active/access/networking mode). For instance, if a device is in monitoring mode, it may gossip more or less frequently as opposed to being in active/access/networking mode. Additionally, or alternatively, in some examples wireless client(s) may cooperate in the tracing and collection procedure(s), therefore extending trace data across the 802.11 channel. Such extension to client device(s) may be done multiple ways, such as in the form of wireless broadcast messages that can be filtered at the receiver stack, by means of action frames if the destination of gossiping is a single node, etc.

In some examples, a collector/controller associated with the network may analyze the telemetry data and query any network device and statistically learn about other trace contexts around the wireless network device who provided the telemetry data and decide whether to collect more information from the neighboring network devices. In some examples, the collector/controller may fetch additional telemetry data from wireless network devices who gossiped when the controller/collector is interested in gathering additional data associated with an event. In some examples, the controller/collector may evaluate device or network constraints when fetching additional telemetry data, such as network bandwidth.

In some examples, to improve the chances of fetching telemetry data from a wireless network device that has pertinent information, the collector or controller may determine a dominating set of wireless network devices or nodes. In some examples, the dominating set may be a set of nodes or wireless devices which are one hop away in connectivity to the rest of the world and there may be many dominating sets. In some examples, the controller or collector may fetch telemetry data from different dominating sets at different intervals. In some examples, such as if redundancy is preferred, the dominating set may be determined such that all the nodes are one hop away from two members of the dominating set. Regardless of implementation, because the members of the dominating set may be one hop away from the rest of the nodes, the controller or collector can simply fetch the telemetry data from the dominating set and be sure to have all the gossips.

In another aspect of this disclosure, techniques are disclosed for intelligently exporting telemetry data from resource-constrained devices towards backend systems without exhausting the resource-constrained devices and/or the backend systems. In various examples, these techniques for intelligently exporting telemetry data may be performed in addition to the gossiping techniques disclosed above and herein, as well as in wired networks where gossiping may not be utilized. In other words, while the techniques can be performed in concert with one another, it is possible in many scenarios for the techniques to be performed independently of one another.

As briefly introduced above, OpenTelemetry allows to create spans which describe the lifetime of a given event and to attach context to it. In examples, spans can be aggregated based on their parent/child relationship whether within a single device or multiple devices. A root span may represent a global view of its children and can, therefore, be used as a macro representation of the event of interest. Today, by default, span sources send their respective view to the telemetry collector with their parent relationship, and the collector creates the spans hierarchy. OpenTelemetry can also export metrics and be used to instrument endpoint information such as memory, CPU, battery consumption, geography, etc.

Resource-constrained devices, such as wireless devices and IoT environments, have some challenges regarding this instrumentation. One of these challenges pertains to the backend system with constrained resources, as mobile deployments can be massive with a significant number of events and traces from a variety of components (e.g., mobile devices, access points, wireless LAN controllers, policy servers, etc.) and/or vendors. This amount of information may overload a backend system and/or the designed resources for this backend system. Another challenge pertains to the device resources, since mobile and IoT devices in general are constrained in terms of memory, CPU, storage and battery. As such, any instrumentation that provides more data than what is needed will unnecessarily drain these resources. Furthermore, mobile, wireless, and/or IoT environment events have a geographic scope as most users are mobile and events typically affect a sub-set of elements in the system.

Accordingly, an additional aspect of this disclosure provides closed-loop techniques for intelligently exporting telemetry data from resource-constrained environment (e.g., wireless environments and generally resource-constrained devices) towards backend systems. For instance, devices and applications may export traces and resource metrics towards a backend system. In some examples, the sampling rate and tracing details can be programmed based on policy (e.g., match→action patterns, such as based on mac-address, service set identifier (SSID), signal-to-noise ration (SNR) level, etc.). In some examples, a telemetry control application running on the backend may collect this information and decide the best possible telemetry strategy for each device based on its available resources and its interaction with other applications such as, for instance, an anomaly detection application. The telemetry control application may also implement closed-loop control logic that analyzes device resources and geographical information. In some examples, the backend system may send telemetry commands back to the devices and applications, completing the closed-loop system.

By way of example, consider a wireless client on-boarding flow, which would be a typical target to track through telemetry according to these techniques. In such an example, a wireless device (e.g., access point, wireless LAN controller, Radius, DHCP) may be configured to export only system ingress and egress spans with identifying wireless context such as wireless client MAC, session, etc. to reduce the amount of telemetry consumed by the telemetry collector and to define the scope of the target telemetry collected. According to the techniques disclosed, on top of the context a severity may also be associated with the flow that would activate the collection of additional spans in the system. In some examples, the severity level may be based on triggering logic at the backend system and may affect one more wireless context based on the issue as well as the resource available within the system to activate additional spans.

In some examples, different implementations for the closed-loop logic in the network devices and network applications may be utilized. As one example, an adaptive sampling implementation may be employed in which a new rule may be decided in the backend system and implemented in the device(s) across the network such that the sampling rate of a device may change as more data is instrumented and reported back to the backend system. In another example, a delay buffer sampling implementation may be used. For instance, the devices may perform the maximum sampling from the network but only reporting what is required by the backend system. The backend may decide after the fact that a level of sampling would have been useful based on external sample, but after the fact logging misses the samples at the time of interest. To still be able to report the appropriate samples, the delay buffer may be added to the sample push interface, so the samples that are evaluated with the current sampling profile are samples that were generated N seconds ago. In examples, once a command is received to increase its telemetry information to be exported, only the exporting matching rule is affected but not the network sampling logic. In some examples, all the samples may be stored in intermediate telemetry records and stored in the delay queue. After a defined amount of time, the samples may be analyzed and a delayed record filter may decide whether the samples are to be sent or dropped. This delayed decision allows to capture events at the time of interest while avoiding sending all records all the time.

In some examples, the telemetry control application hosted in the backend systems (e.g., which could be implemented in wireless LAN controller. Cloud, etc.) may decide on telemetry commands with various strategies. For instance, in a reactive control strategy, the backend system may react to events in the network and send telemetry commands that will only affect future traces and not past information. In this way, the backend system could take a failed mac-address and send a matching rule for that mac-address to the affected access point and/or wireless LAN controller in that geographic region. A future association request from that failing device may also now be instrumented with a finer granularity. The backend system may also monitor CPU, memory, and storage capacity of each device and decide if increasing instrumentation is possible or should be discarded. In additional or alternative examples, the telemetry control application may use a proactive control strategy. For instance, the backend system may predict system-level scenarios where a higher degree of instrumentation may be needed. For example, because association errors increase as the number of associations increase or at specific times in the day, the backend system may increase the instrumentation levels at those specific moments pro-actively before the errors actually happen.

According to the technologies disclosed herein, several advantages in computer-related technology may be realized with respect to performing telemetry in resource-constrained device environments. For instance, by gossiping telemetry information between peer devices of a wireless network such that a controller/collector can fetch the telemetry data from a fraction of the devices allows for telemetry costs to be reduced, as well as for the amount of telemetry data streamed to the controller/collector to be reduced as well. Furthermore, the technique disclosed herein for intelligently exporting telemetry data from resource-constrained devices towards backend systems allows for telemetry to be collected without exhausting the resource-constrained devices and/or the backend systems. In other words, the techniques described herein free up resources and bandwidth that may otherwise be consumed for performing telemetry, but without the risk of losing and/or missing important telemetry data or events. Other advantages in computer-related technology will be readily apparent to those having ordinary skill in the art.

By way of example, and not limitation, a method according to the techniques described herein may include determining a dominating set of network devices of a wireless network. In some examples, the dominating set may be determined by a controller or collector of the wireless network. In some examples, the dominating set may include one or more network devices. In some examples, a first network device of the dominating set may wirelessly communicate with a second network device that is excluded from the dominating set. In some examples, the second network device may be one hop away in communication from the first network device. Additionally, in some instances, the second network device may be one hop away from one or more other member devices of the dominating set. In one example, each network device or node that is excluded from the dominating set may be one hop away from either at least one or at least two members of the dominating set. In some examples, the first network device and the second network device may both be wireless access points or may both be wireless clients. In some examples, the first network device may be a wireless access point and the second network device may be a wireless client, and/or vice-versa.

In some examples, the controller/collector may obtain telemetry data from the first network device based at least in part on the first network device being included in the dominating set. That is, the controller/collector may refrain from obtaining telemetry data from devices that are excluded from the dominating set, at least until the controller decides that some event needs more attention. Additionally, or alternatively, the devices excluded from the dominating set may refrain from sending telemetry data to the collector unless requested and may, instead, gossip their telemetry data to neighboring devices. In some examples, the telemetry data may be gossiped (e.g., broadcasted) in the wireless network between the network devices.

In some examples, the telemetry data obtained by the controller/collector may include first context information that was generated by the second network device and that is related to an event detected in the wireless network. Additionally, in some examples, the telemetry data may include second context information that was generated by the first network device. In some instances, the second context information may be related to the event but provide a different viewpoint of the event than the first context information (e.g., from the first network device's perspective instead of the second network device). Additionally, in some examples, the telemetry data may include third context information that was generated by a third network device. Similarly, the third context information may be related to the event and provide another different viewpoint. In examples, the context information may include one or more of traces, logs, and/or metrics associated with the event, and/or instrumentation data (e.g., which may be real data or metadata).

In some examples, the controller/collector may determine, based at least in part on the telemetry data/context information, that the second network device has greater information related to the event than the first network device. For instance, the controller/collector may determine based on the context information or telemetry data that the second network device experienced the event or was nearby or was at the center of the event and likely has better information about the event (e.g., such as information regarding what caused the event, which devices were affected by the event, a trace span of the event, etc.). In examples, based at least in part on determining that the second network device has the greater information, the controller/collector may fetch or otherwise obtain, from the second network device, additional information related to the event. That is, the controller/collector may obtain more detailed information about the from the second network device for analyzing the event and/or redressing the event. In some examples, the determination that the second network device has the greater information may be based at least in part on the first context information, as well as second context information, third context information, etc., which may be generated by other devices. In some instances, the controller/collector may analyze the context information to determine which node/device has greater information.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture of a network 102 that may implement various aspects of the technologies described herein. The network 102 may be representative of a wireless local area network (LAN). For instance, the network devices 106(1)-106(N) (where "N" may be equal to any number of devices) (hereinafter referred to collectively as "network devices 106") may communicate wirelessly with one another. In some examples, the network devices 106 may be any type of network device capable of wireless communications, including access points, wireless clients, or the like. Additionally, in some examples, the controller 104 of the network 102 may communicate wirelessly with any one of the network devices 106. In some examples, the controller 104 may be a wireless local area network controller.

In FIG. 1, at steps labeled "1," the network device 106(2) may gossip 108 with its neighboring devices, namely the network device 106(1), 106(3), and 106(N). In some examples, the network device 106(2) may gossip instrumentation data, traces, logs, metrics, spans, or other telemetry information associated with detected events with its neighbor devices. In some examples, to gossip this information may mean to broadcast this information to any listening device. That is, the network devices 106(1), 106(3), and 106(N) may not necessarily be requesting the network deice 106(2) to gossip 108 this information, but they may nonetheless be monitoring the network 102 for this information and keeping track of the information being gossiped.

In some examples, based on gossiped information, a network device 106 may detect a problem or other event in the network 102 and report it to a device who may be interested. For instance, at "2," the network device 106(1) sends telemetry data 110 to the controller 104. The telemetry data 110 may include some or all of the information that was gossiped by the network device 106(2). In examples, the network device 106(1) may send the telemetry data 110 to the controller 104 based on a determination that the information gossiped by the network device 106(2) would be of interest to the controller 104. Similarly, the network device 106(1) may share the telemetry data 110 with other devices who might be interested in the information.

At "3," the controller 104 may send a request 112 to the network device 106(2). In some examples, the request 112 may be for additional information. For instance, the controller 104 may determine that an event of interest occurred on or near the network device 106(2), and that the network device 106(2) might have additional information related to the event of interest to help build a complete picture of the event. As such, the controller 104 may send the request 112 for this additional information. In some examples, the request 112 may be for additional instrumentation data related to the event, a trace context associated with the event, logs associated with the event, metrics, or the like.

Figure 2:
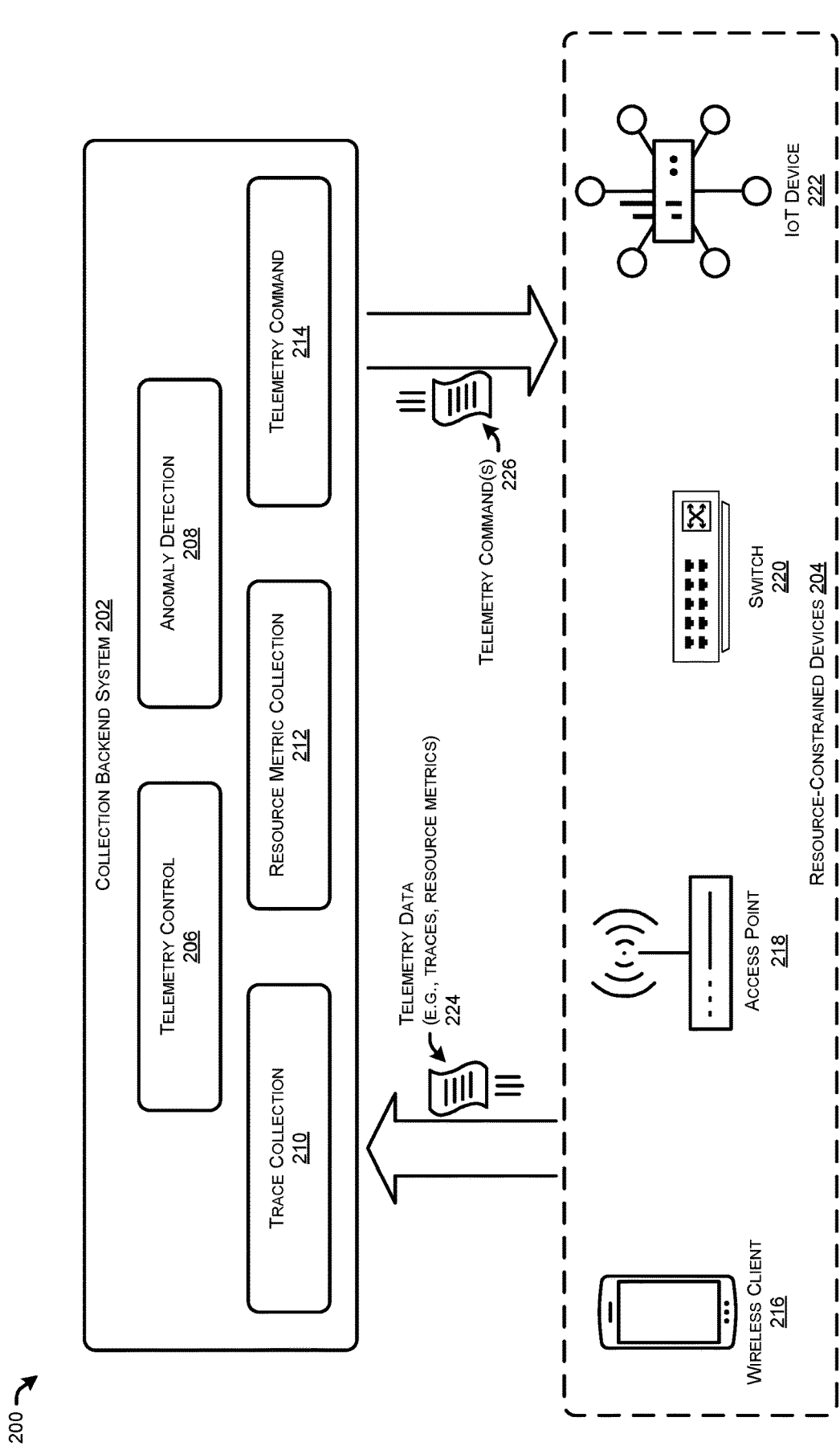
FIG. 2 illustrates another example architecture that may implement various aspects of the technologies described herein.

FIG. 2 illustrates another example architecture 200 that may implement various aspects of the technologies described herein. The architecture 200 includes one or more collection backend system 202. The collection backend system 202 may be one or more servers, virtual servers, computing devices, or the like that are running various components or applications associated with intelligently collecting telemetry data from the resource-constrained devices 204. In examples, the network devices 106 in FIG. 1 may be resource-constrained devices 204.

For instance, the collection backend system 202 may include a telemetry control component 206 (e.g., or application), an anomaly detection component 208, a trace collection component 210, a resource metric collection component 212, and a telemetry command component 214. In examples, the resource-constrained devices 204 may include various different types of devices, such as a wireless client 216 (e.g., phone, tablet, laptop, or other mobile communication device), an access point 218 (e.g., wireless access point), a switch 220, and an IoT device 222.

As shown in FIG. 2, the resource-constrained devices 204 may send telemetry data 224, such as traces, resource metrics, instrumentation context, etc., toto the collection backend system 202. In some examples, the sampling rate and tracing details for the resource-constrained devices 204 to report the telemetry data 224 can be programmed based on policy (e.g., match→action patterns, such as based on mac-address, service set identifier (SSID), signal-to-noise ration (SNR) level, etc.). In some examples, the telemetry control component 206 running on the collection backend system 202 may receive the telemetry data 224 from the resource-constrained devices 204 and decide the best possible telemetry strategy for each device based on its available resources and its interaction with other applications or components such as, the anomaly detection component 208. The telemetry control component 206 may also implement closed-loop control logic that analyzes device resources and geographical information. In some examples, the collection backend system 202 may send one or more telemetry command(s) 226 back to the resource-constrained devices 204, instructing the resource-constrained devices 204 about how to report their telemetry data 224, including what to report, how often to report, granularity of detail to report, etc.

In some examples, an adaptive sampling implementation may be employed by the collection backend system 202 in which a new rule may be decided and implemented in the resource-constrained devices 204 such that the sampling rate of a device may change as more data is instrumented and reported back to the collection backend system 202. In another example, a delay buffer sampling implementation may be used. For instance, the resource-constrained devices 204 may perform the maximum sampling from the network but only report what is required by the collection backend system 202. The collection backend system 202 may decide after the fact that a level of sampling would have been useful based on an external sample, but after the fact logging misses the samples at the time of interest. To still be able to report the appropriate samples, the delay buffer may be added to the sample push interface of the resource-constrained devices 204 so the samples that are evaluated with the current sampling profile are samples that were generated N seconds ago. In examples, once a command is received to increase its telemetry information to be exported, the exporting matching rule may be affected but not the network sampling logic. In some examples, all the samples may be stored in intermediate telemetry records and stored in the delay queue. After a defined amount of time, the samples may be analyzed and a delayed record filter may decide whether the samples are to be sent in the telemetry data 224 or dropped. This delayed decision allows to capture events at the time of interest while avoiding sending all records all of the time.

In some examples, the telemetry control component 206 hosted in the collection backend system 202 (e.g., which could be implemented in wireless LAN controller, Cloud, etc.) may decide on telemetry command(s) 226 with various strategies. For instance, in a reactive control strategy, the collection backend system 202 may react to events in the network and send telemetry command(s) 226 that will only affect future traces and not past information. In this way, the collection backend system 202 could take a failed mac-address and send a matching rule for that mac-address to the affected access point 218 and/or wireless LAN controller in that geographic region. A future association request from that failing device may also now be instrumented with a finer granularity. The collection backend system 202 may also monitor CPU, memory, and storage capacity of each of the resource-constrained devices 204 and decide if increasing instrumentation is possible or should be discarded. In additional or alternative examples, the telemetry control component 206 may use a proactive control strategy. For instance, the collection backend system 202 may predict system-level scenarios where a higher degree of instrumentation may be needed. For example, because association errors increase, statistically, as the number of associations increase or at specific times in the day, the collection backend system 202 may increase the instrumentation levels at those specific moments pro-actively before the errors actually happen.

Figure 3:
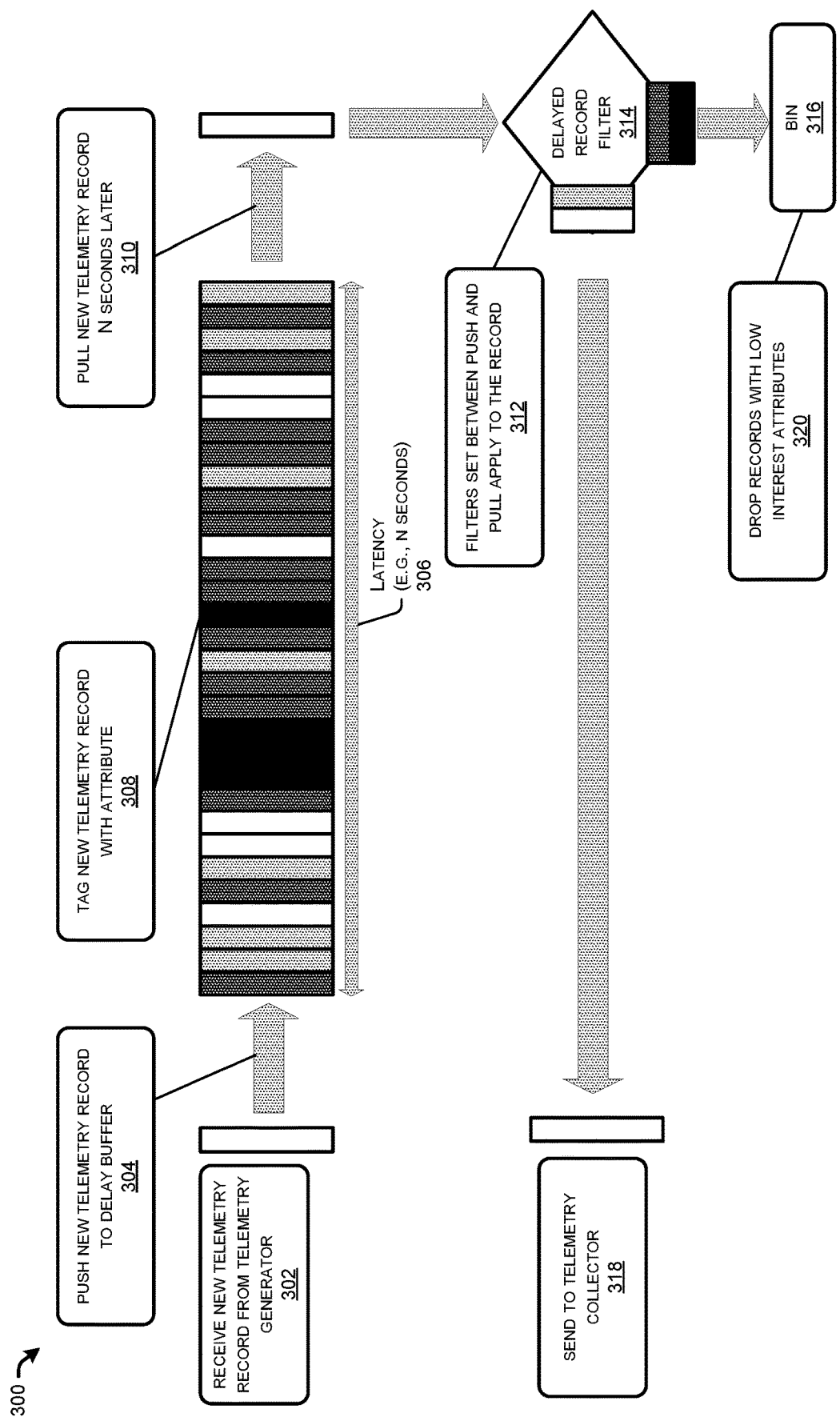
FIG. 3 is a pictorial flow diagram illustrating an example method associated with implementing a delay buffer according to the techniques disclosed herein.

FIG. 3 is a pictorial flow diagram illustrating an example method 300 associated with implementing a delay buffer according to the techniques disclosed herein. For instance, any of the resource-constrained devices 204 of FIG. 2 may implement the delay buffer according to the method 300 or similar techniques.

At operation 302, a new telemetry record (e.g., event) is received from a telemetry generator. At operation 304, the new telemetry record is pushed to a delay buffer, which may have a latency 306 of N seconds, where N represents any number. In some examples, the latency 306 may be configured based on network demands or policy.

At operation 308, the new telemetry record may be tagged with an attribute. For instance, light colored telemetry records may be of high importance and dark colored records may be of lower importance. At operation 310, the new telemetry record is pulled from the delay buffer after N seconds and, at operation 312, the new telemetry record is fed into a delayed record filter 314, where filters set between push and pull apply to the record. In various examples, the delayed record filter 314 is what is changed responsive to the collection backend system determining that sampling is to be increased or decreased. For instance, the lighter colored records of higher importance are filtered to be sent to the collector whereas the darker colored records of lower importance are filtered into a bin 316, where they may be discarded in some instances. However, if the collection backend system were to implement a higher sampling rate, one or more of the darker colored records may be filtered to be sent to the collector.

At operation 318, the new telemetry record is filtered and sent to the telemetry collector (e.g., collection backend system). Conversely, at operation 320, the records having low interest attributes may be dropped.

Figure 4:
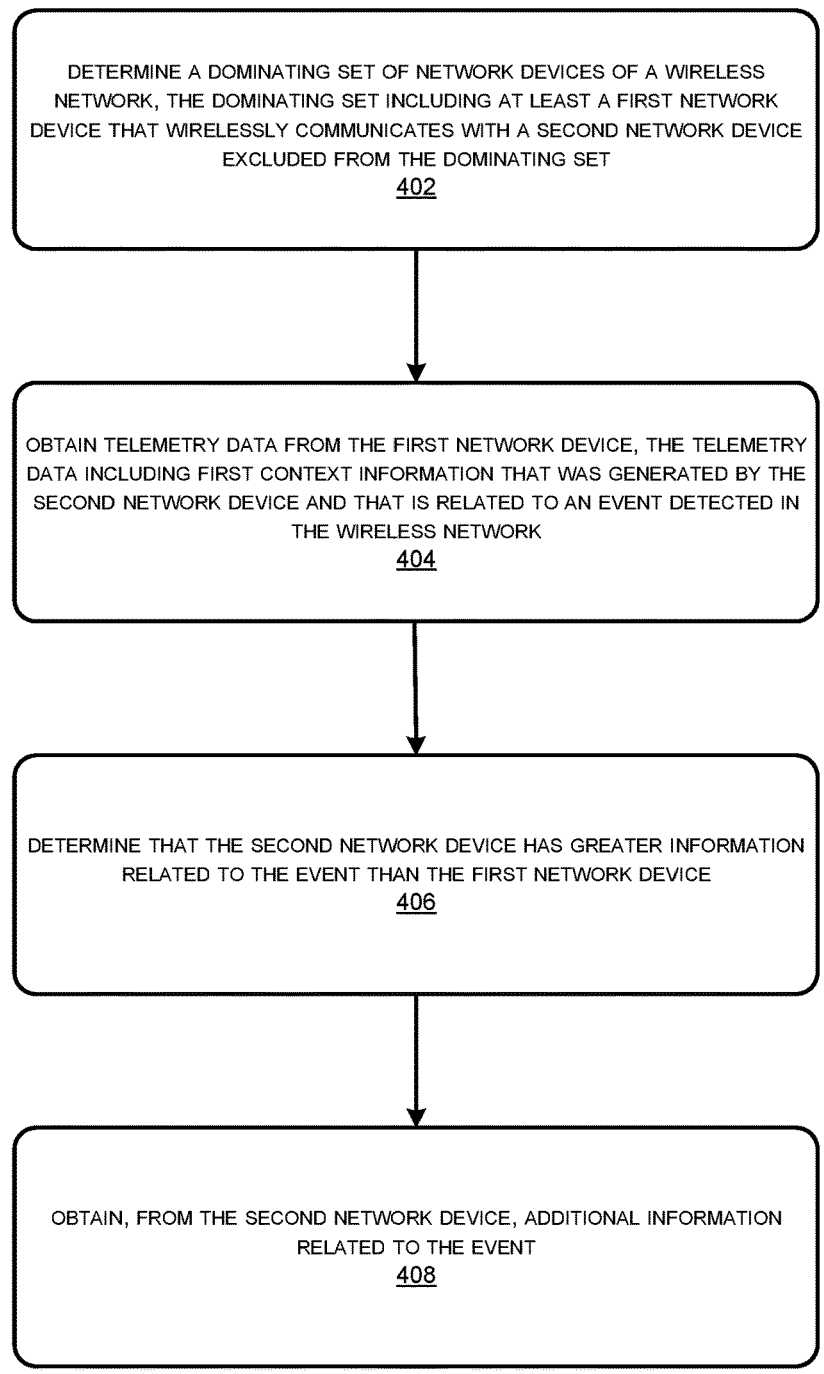
FIG. 4 is a flowchart illustrating an example method associated with gossiping telemetry information between peer devices of a wireless network.
Figure 5:
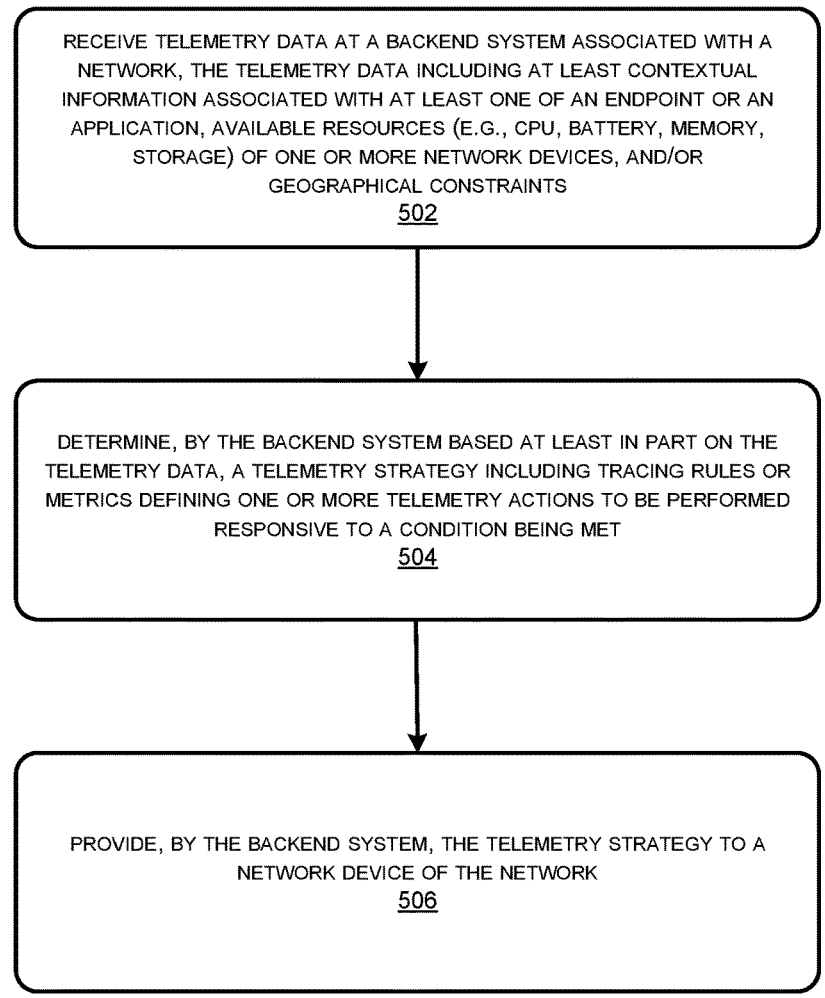
FIG. 5 is a flowchart illustrating an example method associated with determining a telemetry strategy for resource-constrained devices.
Figure 6:
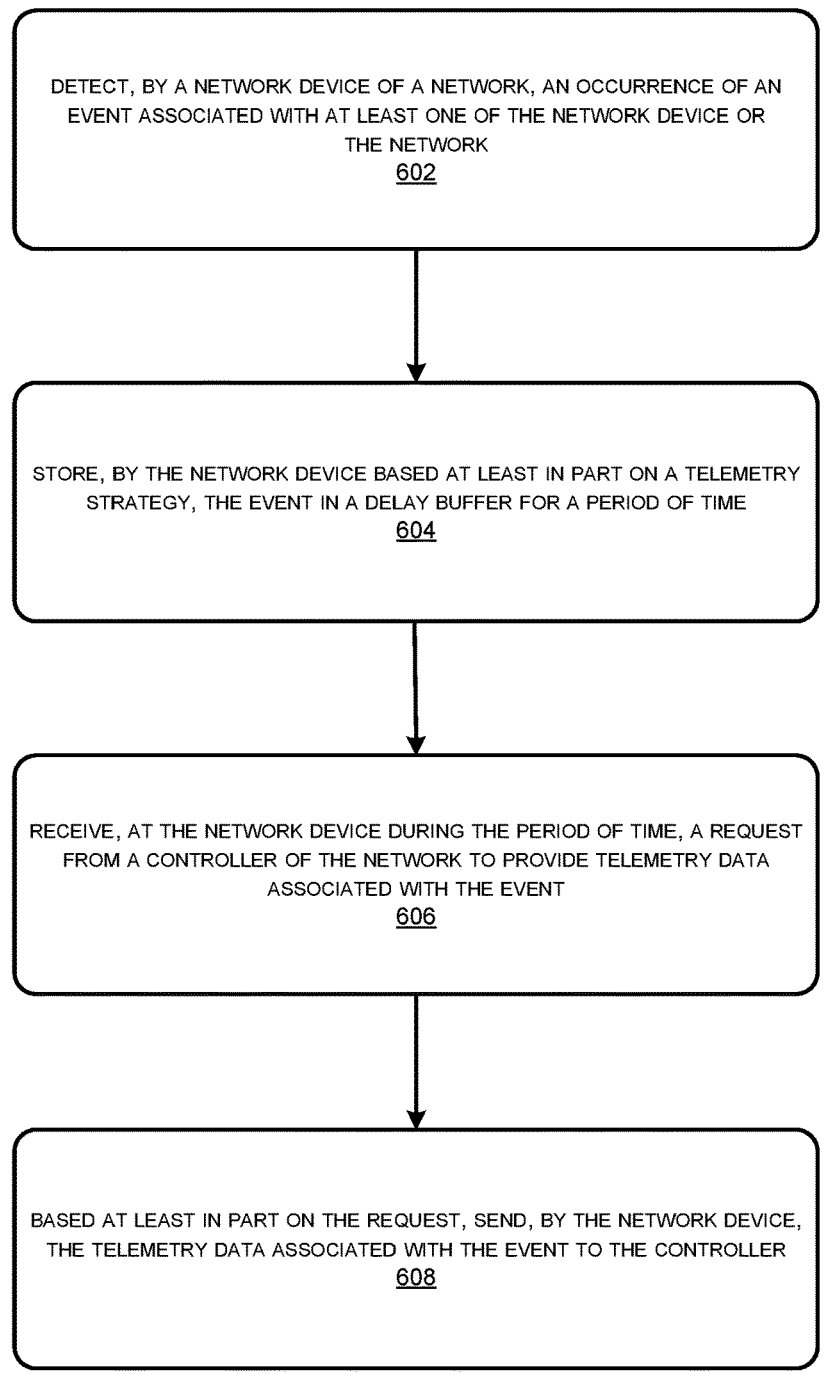
FIG. 6 is a flowchart illustrating an example method associated with implementing a delay buffer for telemetry events according to the techniques disclosed herein.

FIGS. 4-6 are flowcharts illustrating example methods 400, 500, and 600 associated with the techniques described herein. The logical operations described herein with respect to FIGS. 4-6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 4-6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 is a flowchart illustrating an example method 400 associated with gossiping telemetry information between peer devices of a wireless network. The method 400 begins at operation 402, which includes determining a dominating set of network devices of a wireless network, the dominating set including at least a first network device that wirelessly communicates with a second network device excluded from the dominating set. For instance, the controller 104 and/or the collection backend system 202 may determine the dominating set of network devices 106 of a wireless network 102.

At operation 404, the method 400 includes obtaining telemetry data from the first network device, the telemetry data including first context information that was generated by the second network device and that is related to an event detected in the wireless network. For instance, the controller 104 and/or the collection backend system 202 may obtain the telemetry data 110 from the first network device 106(1), the telemetry data 110 including first context information that was generated by the second network device 106(2) and that is related to an event detected in the wireless network 102.

At operation 406, the method 400 includes determining that the second network device has greater information related to the event than the first network device. For instance, the controller 104 and/or the collection backend system 202 may determine that the second network device 106(2) has greater information related to the event than the first network device 106(1).

At operation 408, the method 400 includes obtaining, from the second network device, additional information related to the event. For instance, the controller 104 and/or the collection backend system 202 may obtain the additional information related to the event from the second network device 106(2).

FIG. 5 is a flowchart illustrating an example method 500 associated with determining a telemetry strategy for resource-constrained devices. The method 500 begins at operation 502, which includes receiving telemetry data at a backend system associated with a network, the telemetry data including at least contextual information associated with at least one of an endpoint or an application, available resources (e.g., CPU, battery, memory, storage) of one or more network devices, and/or geographical constraints. For instance, the controller 104 and/or the collection backend system 202 may receive the telemetry data 110 including at least contextual information associated with at least one of an endpoint or an application, available resources (e.g., CPU, battery, memory, storage) of one or more network devices 106 or resource-constrained devices 204, and/or geographical constraints At operation 504, the method 500 includes determining, by the backend system based at least in part on the telemetry data, a telemetry strategy including tracing rules or metrics defining one or more telemetry actions to be performed responsive to a condition being met. For instance, the controller 104 and/or the collection backend system 202 may determine, based at least in part on the telemetry data 110, a telemetry strategy including tracing rules or metrics defining one or more telemetry actions to be performed responsive to a condition being met.

At operation 506, the method 500 includes providing, by the backend system, the telemetry strategy to a network device of the network. For instance, the controller 104 and/or the collection backend system 202 may provide the telemetry strategy to a network device 106 (e.g., resource-constrained device) of the network 102.

FIG. 6 is a flowchart illustrating an example method 600 associated with implementing a delay buffer for telemetry events according to the techniques disclosed herein. The method 600 begins at operation 602, which includes detecting, by a network device of a network, an occurrence of an event associated with at least one of the network device or the network. For instance, the network device 106 and/or any of the resource-constrained devices 204 may detect the occurrence of an event. In some examples, the network device 106 and/or any of the resource-constrained devices 204 may generate a telemetry record associated with the event.

At operation 604, the method 600 includes storing, by the network device based at least in part on a telemetry strategy, the event in a delay buffer for a period of time. For instance, the network device 106 and/or any of the resource-constrained devices 204 may store the event (e.g., or a telemetry record of the event) in a delay buffer for a period of time.

At operation 606, the method 600 includes receiving, at the network device during the period of time, a request from a controller of the network to provide telemetry data associated with the event. For instance, the network device 106 and/or any of the resource-constrained devices 204 may receive, during the period of time, a request from the controller 104 (e.g., the collection backend system 202) of the network 102 to provide telemetry data associated with the event.

At operation 608, the method 600 includes based at least in part on the request, send, by the network device, the telemetry data associated with the event to the controller. For instance, the network device 106 and/or any of the resource-constrained devices 204 may send, based at least in part on the request, the telemetry data associated with the event to the controller 104.

Figure 7:
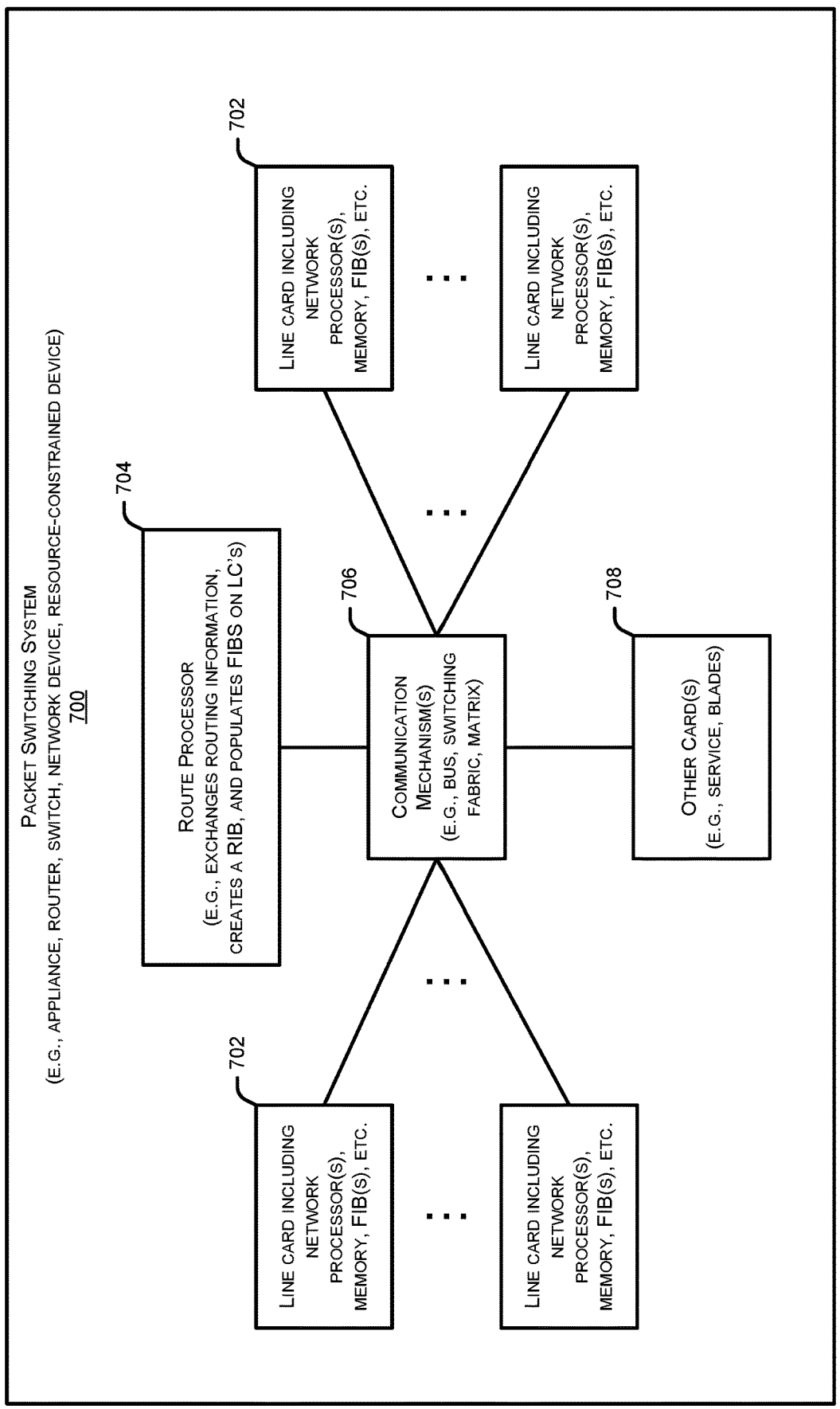
FIG. 7 is a block diagram illustrating an example packet switching system that can be utilized to implement various aspects of the technologies disclosed herein.

FIG. 7 is a block diagram illustrating an example packet switching device 700 (or packet switching system) that can be utilized to implement various aspects of the technologies disclosed herein. In some examples, packet switching device(s) 700 may be employed in various networks and architectures, such as, for example, the network 102 and the architectures 100 and 200 as described with respect to FIGS. 1-2. In examples, the network device 106 and resource-constrained devices 204 may be packet switching device(s) 700.

In some examples, a packet switching device 700 may comprise multiple line card(s) 702, each with one or more network interfaces for sending and receiving packets over communications links (e.g., possibly part of a link aggregation group). The packet switching device 700 may also have a control plane with one or more route processor 704 elements for managing the control plane and/or control plane processing of packets associated with forwarding of packets in a network, including, but not limited to, exchanging routing information, creating routing information base(s) (RIBs), and/or populating forward information base(s) (FIBs) on LCs. The packet switching device 700 may also include other cards 708 (e.g., service cards, blades) which include processing elements that are used to process (e.g., forward/send, drop, manipulate, change, modify, receive, create, duplicate, apply a service) packets associated with forwarding of packets in a network. The packet switching device 700 may include hardware-based communication mechanism(s) 706(e.g., bus, switching fabric, and/or matrix, etc.) for allowing its different entities to communicate. The line card(s) 702 may typically perform the actions of being both an ingress and/or an egress line card 702 in regard to multiple other particular packets and/or packet streams being received by, or sent from, packet switching device 700.

Figure 8:
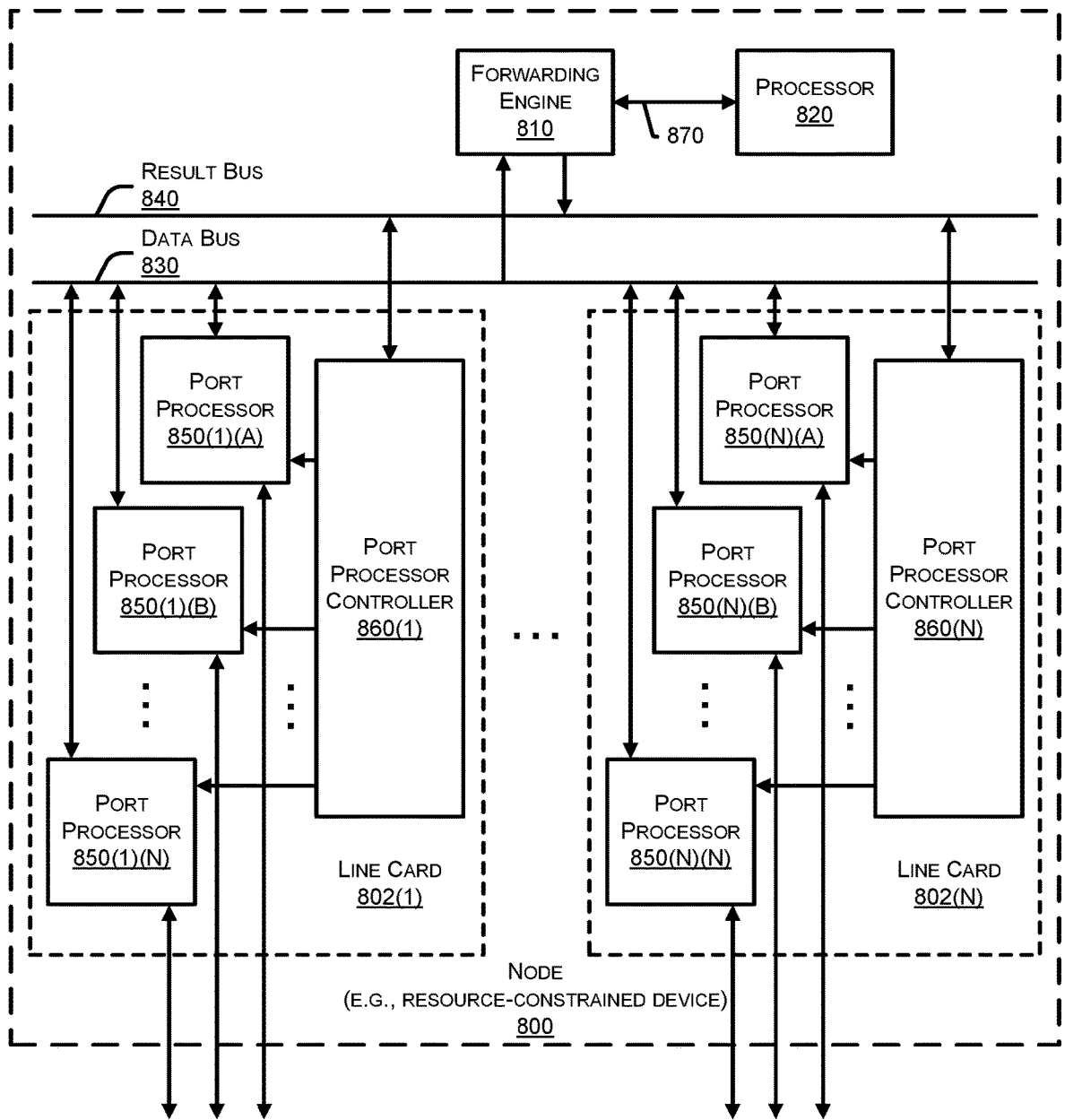
FIG. 8 is a block diagram illustrating certain components of an example node that can be utilized to implement various aspects of the technologies disclosed herein.

FIG. 8 is a block diagram illustrating certain components of an example node 800 that can be utilized to implement various aspects of the technologies disclosed herein. In some examples, node(s) 800 may be employed in various architectures and networks, such as, for example, the network 102 and the architectures 100 and 200 as described with respect to FIGS. 1-2. In examples, the resource-constrained devices 204 and network device 106 may be node(s) 800.

In some examples, node 800 may include any number of line cards 802 (e.g., line cards 802(1)-(N), where N may be any integer greater than 1) that are communicatively coupled to a forwarding engine 810 (also referred to as a packet forwarder) and/or a processor 820 via a data bus 830 and/or a result bus 840. Line cards 802(1)-(N) may include any number of port processors 880(1)(A)-(N)(N) which are controlled by port processor controllers 860(1)-(N), where N may be any integer greater than 1. Additionally, or alternatively, forwarding engine 810 and/or processor 820 are not only coupled to one another via the data bus 830 and the result bus 840, but may also communicatively coupled to one another by a communications link 870.

The processors (e.g., the port processor(s) 880 and/or the port processor controller(s) 860) of each line card 802 may be mounted on a single printed circuit board. When a packet or packet and header are received, the packet or packet and header may be identified and analyzed by node 800 (also referred to herein as a router) in the following manner. Upon receipt, a packet (or some or all of its control information) or packet and header may be sent from one of port processor(s) 880(1)(A)-(N)(N) at which the packet or packet and header was received and to one or more of those devices coupled to the data bus 830 (e.g., others of the port processor(s) 880(1)(A)-(N)(N), the forwarding engine 810 and/or the processor 820). Handling of the packet or packet and header may be determined, for example, by the forwarding engine 810. For example, the forwarding engine 810 may determine that the packet or packet and header should be forwarded to one or more of port processors 880(1)(A)-(N)(N). This may be accomplished by indicating to corresponding one(s) of port processor controllers 860(1)-(N) that the copy of the packet or packet and header held in the given one(s) of port processor(s) 880(1)(A)-(N)(N) should be forwarded to the appropriate one of port processor(s) 880(1)(A)-(N)(N). Additionally, or alternatively, once a packet or packet and header has been identified for processing, the forwarding engine 810, the processor 820, and/or the like may be used to process the packet or packet and header in some manner and/or maty add packet security information in order to secure the packet. On a node 800 sourcing such a packet or packet and header, this processing may include, for example, encryption of some or all of the packet's and/or header's information, the addition of a digital signature, and/or some other information and/or processing capable of securing the packet or packet and header. On a node 800 receiving such a processed packet or packet and header, the corresponding process may be performed to recover or validate the packet's and/or header's information that has been secured.

Figure 9:
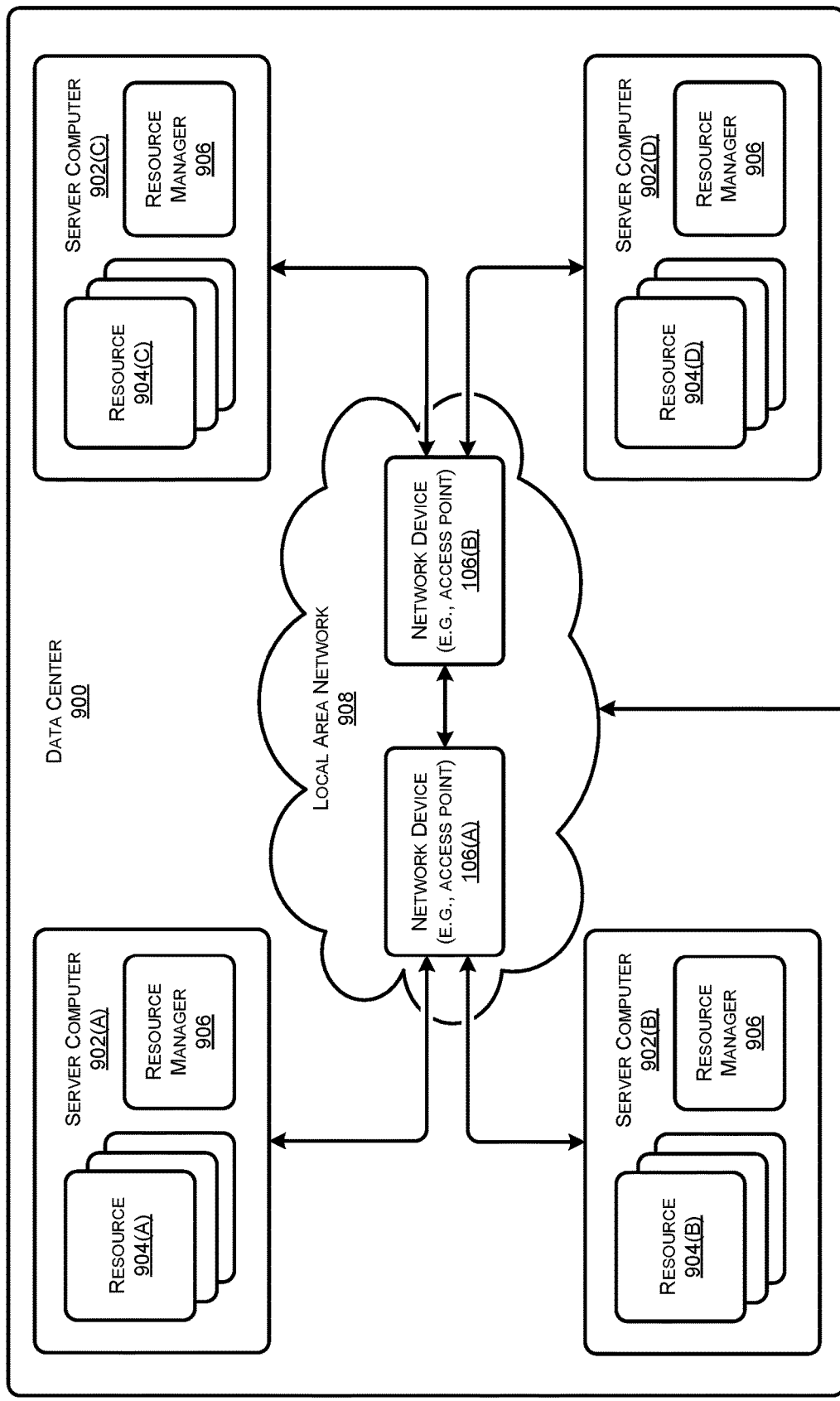
FIG. 9 is a computing system diagram illustrating an example configuration of a data center that can be utilized to implement aspects of the technologies disclosed herein.

FIG. 9 is a computing system diagram illustrating an example configuration of a data center 900 that can be utilized to implement aspects of the technologies disclosed herein. The example data center 900 shown in FIG. 9 includes several server computers 902A-902F (which might be referred to herein singularly as "a server computer 902" or in the plural as "the server computers 902") for providing computing resources. In some examples, the resources and/or server computers 902 may include, or correspond to, the any type of networked device described herein. Although described as servers, the server computers 902 may comprise any type of networked device, such as servers, switches, routers, hubs, bridges, gateways, modems, repeaters, access points, proxies, etc.

The server computers 902 can be standard tower, rackmount, or blade server computers configured appropriately for providing computing resources. In some examples, the server computers 902 may provide computing resources 904 including data processing resources such as VM instances or hardware computing systems, database clusters, computing clusters, storage clusters, data storage resources, database resources, networking resources, VPNs, and others. Some of the servers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902. Server computers 902 in the data center 900 can also be configured to provide network services and other types of services.

In the example data center 900 shown in FIG. 9, an appropriate LAN 908 (local area network) may be utilized to interconnect the server computers 902A-902F. The LAN 908 may correspond with the network 102 and include various network devices 106. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers, between each of the server computers 902A-902F in each data center 900, and, potentially, between computing resources in each of the server computers 902. It should be appreciated that the configuration of the data center 900 described with reference to FIG. 9 is merely illustrative and that other implementations can be utilized.

In some instances, the data center 900 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources 904 provided by the cloud computing network can include various types of computing resources, such as data processing resources like tenant containers and VM instances, data storage resources, networking resources, data communication resources, network services, VPN instances, and the like.

Each type of computing resource 904 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 904 not mentioned specifically herein.

The computing resources 904 provided by a cloud computing network may be enabled in one embodiment by one or more data centers 900 (which might be referred to herein singularly as "a data center 900" or in the plural as "the data centers 900"). The data centers 900 are facilities utilized to house and operate computer systems and associated components. The data centers 900 typically include redundant and backup power, communications, cooling, and security systems. The data centers 900 can also be located in geographically disparate locations. One illustrative embodiment for a data center 900 that can be utilized to implement the technologies disclosed herein will be described below with regard to FIG. 10.

Figure 10:
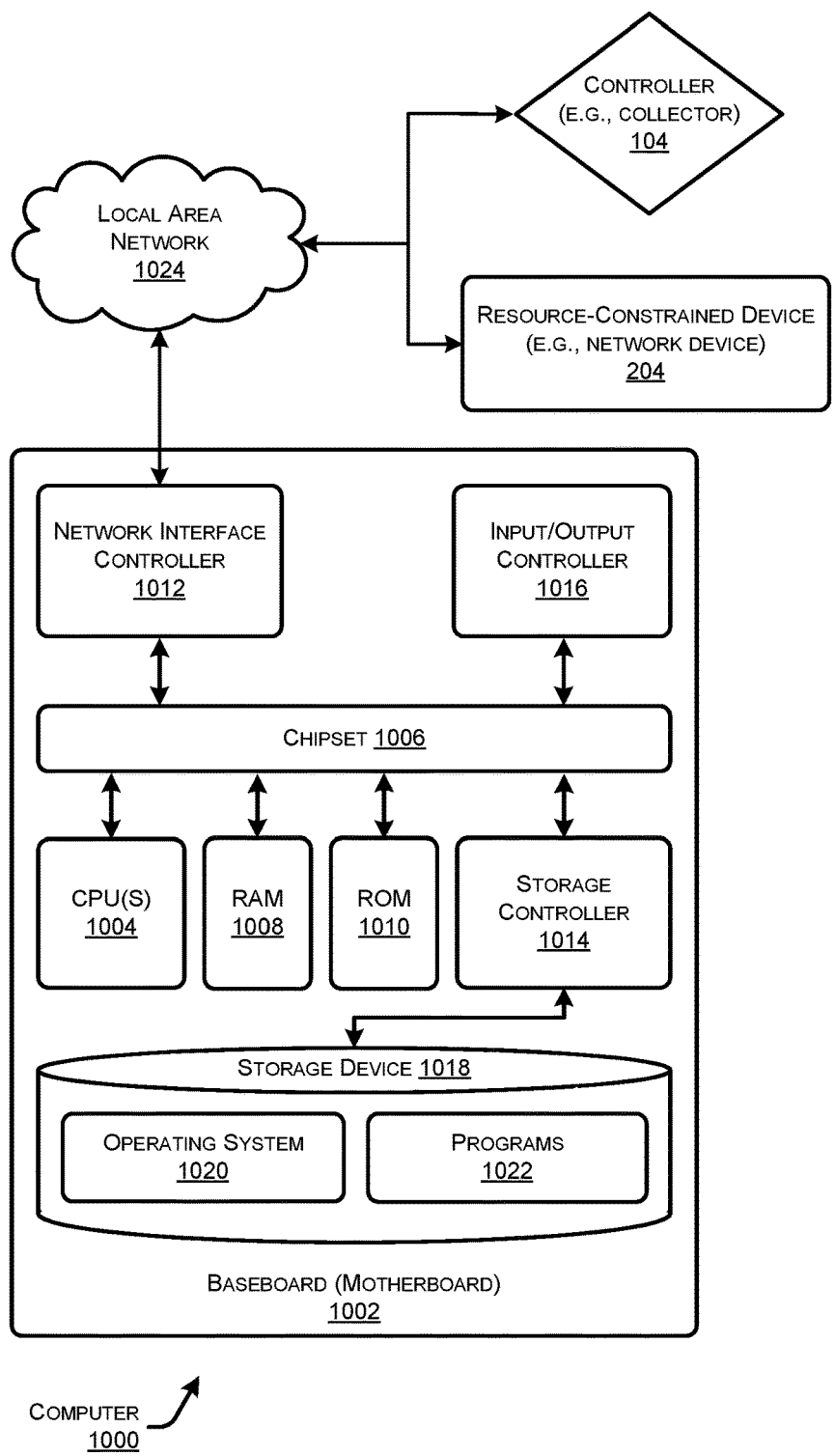
FIG. 10 is a computer architecture diagram showing an illustrative computer hardware architecture for implementing a computing device that can be utilized to implement aspects of the various technologies presented herein.

FIG. 10 is a computer architecture diagram showing an illustrative computer hardware architecture for implementing a computing device that can be utilized to implement aspects of the various technologies presented herein. The computer architecture shown in FIG. 10 illustrates a conventional server computer, network device, controller, workstation, desktop computer, laptop, tablet, network appliance, e-reader, smartphone, load balancer, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network. The chipset 1006 can include functionality for providing network connectivity through a NIC 1012, such as a gigabit Ethernet adapter. The NIC 1012 is capable of connecting the computer 1000 to other computing devices over the network 1024, such as the controller 104, the resource-constrained device 204, and/or any other network devices described herein. It should be appreciated that multiple NICs 1012 can be present in the computer 1000, connecting the computer to other types of networks and remote computer systems. In some examples, the NIC 1012 may be configured to perform at least some of the techniques described herein.

The computer 1000 can be connected to a storage device 1018 that provides non-volatile storage for the computer. The storage device 1018 can store an operating system 1020, programs 1022, and data, which have been described in greater detail herein. The storage device 1018 can be connected to the computer 1000 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like.

For example, the computer 1000 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the architectures 100 and/or 200 and/or any components included therein, may be supported by one or more devices similar to computer 1000. Stated otherwise, some or all of the operations performed by the architectures 100 and/or 200, and/or any components included therein, may be performed by one or more computer devices 1000 operating in a scalable arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1018 can store other system or application programs and data utilized by the computer 1000.

In one embodiment, the storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes and functionality described above with regard to FIGS. 1-6, and herein. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

The computer 1000 may include one or more hardware processors (processors) configured to execute one or more stored instructions. The processor(s) may comprise one or more cores. Further, the computer 1000 may include one or more network interfaces configured to provide communications between the computer 1000 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1022 may comprise any type of programs or processes to perform the techniques described in this disclosure, such as for gossiping telemetry information between peer devices of a wireless network and/or intelligently exporting telemetry data from resource-constrained devices towards backend systems without exhausting the resource-constrained devices and/or the backend systems.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    determining a dominating set of network devices of a wireless network, the dominating set including at least a first network device that wirelessly communicates with a second network device excluded from the dominating set;
    obtaining telemetry data from the first network device based at least in part on the first network device being included in the dominating set, the telemetry data including first context information that was generated by the second network device and that is related to an event detected in the wireless network;
    determining, based at least in part on the telemetry data, that the second network device has greater information related to the event than the first network device; and
    based at least in part on determining that the second network device has the greater information, obtaining, from the second network device, additional information related to the event.

2. The method of claim 1, wherein the telemetry data further includes second context information that was generated by the first network device and that is related to the event, and wherein determining that the second network device has the greater information is based at least in part on the first context information and the second context information.

3. The method of claim 1, wherein the telemetry data further includes second context information that was generated by a third network device and that is related to the event, the method further comprising:
    analyzing the first context information and the second context information; and
    determining, based at least in part on the analyzing, that the second network device has the greater information related to the event than the third network device,
    wherein the obtaining, from the second network device, the additional information related to the event is further based at least in part on determining that the second network device has the greater information.

4. The method of claim 1, wherein the telemetry data further includes second context information that was generated by a third network device and that is related to the event, the method further comprising obtaining, from the third network device the additional information related to the event.

5. The method of claim 4, wherein the second network device is an access point device and the third network device is a client device.

6. The method of claim 1, wherein the second network device is one hop away in connectivity from at least the first network device and a third network device of the dominating set.

7. The method of claim 1, wherein the first context information comprises at least one of traces, logs, or metrics associated with the event.

8. The method of claim 1, wherein the first context information was broadcasted in the wireless network by the second network device.

9. A system comprising:
    one or more processors; and
    one or more non-transitory computer-readable media storing instructions that, when executed, cause the one or more processors to perform operations comprising:
        determining a dominating set of network devices of a wireless network, the dominating set including at least a first network device that wirelessly communicates with a second network device excluded from the dominating set;
        obtaining telemetry data from the first network device based at least in part on the first network device being included in the dominating set, the telemetry data including first context information that was generated by the second network device and that is related to an event detected in the wireless network;
        determining, based at least in part on the telemetry data, that the second network device has greater information related to the event than the first network device; and
        based at least in part on determining that the second network device has the greater information, obtaining, from the second network device, additional information related to the event.

10. The system of claim 9, wherein the telemetry data further includes second context information that was generated by the first network device and that is related to the event, and wherein determining that the second network device has the greater information is based at least in part on the first context information and the second context information.

11. The system of claim 9, wherein the telemetry data further includes second context information that was generated by a third network device and that is related to the event, the operations further comprising:
    analyzing the first context information and the second context information; and
    determining, based at least in part on the analyzing, that the second network device has the greater information related to the event than the third network device,
    wherein the obtaining, from the second network device, the additional information related to the event is further based at least in part on determining that the second network device has the greater information.

12. The system of claim 9, wherein the telemetry data further includes second context information that was generated by a third network device and that is related to the event, the operations further comprising obtaining, from the third network device the additional information related to the event.

13. The system of claim 12, wherein the second network device is an access point device and the third network device is a client device.

14. The system of claim 9, wherein the second network device is one hop away in connectivity from at least the first network device and a third network device of the dominating set.

15. The system of claim 9, wherein the first context information comprises at least one of traces, logs, or metrics associated with the event.

16. The system of claim 9, wherein the first context information was broadcasted in the wireless network by the second network device.

17. One or more non-transitory computer-readable media storing instructions that, when executed, cause one or more processors to perform operations comprising:

determining a dominating set of network devices of a wireless network, the dominating set including at least a first network device that wirelessly communicates with a second network device excluded from the dominating set;

obtaining telemetry data from the first network device based at least in part on the first network device being included in the dominating set, the telemetry data including first context information that was generated by the second network device and that is related to an event detected in the wireless network;

determining, based at least in part on the telemetry data, that the second network device has greater information related to the event than the first network device; and based at least in part on determining that the second network device has the greater information, obtaining, from the second network device, additional information related to the event.

18. The one or more non-transitory computer-readable media of claim 17, wherein the telemetry data further includes second context information that was generated by the first network device and that is related to the event, and wherein determining that the second network device has the greater information is based at least in part on the first context information and the second context information.

19. The one or more non-transitory computer-readable media of claim 17, wherein the telemetry data further includes second context information that was generated by a third network device and that is related to the event, the operations further comprising:

analyzing the first context information and the second context information; and determining, based at least in part on the analyzing, that the second network device has the greater information related to the event than the third network device, wherein the obtaining, from the second network device, the additional information related to the event is further based at least in part on determining that the second network device has the greater information.

20. The one or more non-transitory computer-readable media of claim 17, wherein the telemetry data further includes second context information that was generated by a third network device and that is related to the event, the operations further comprising obtaining, from the third network device the additional information related to the event.

\* \* \* \* \*